(Model.)
J. DAIN, Jr.
HAY ELEVATOR AND STACKER.
No. 252,303.
2 Sheets—Sheet 1.
Patented Jan. 17, 1882.
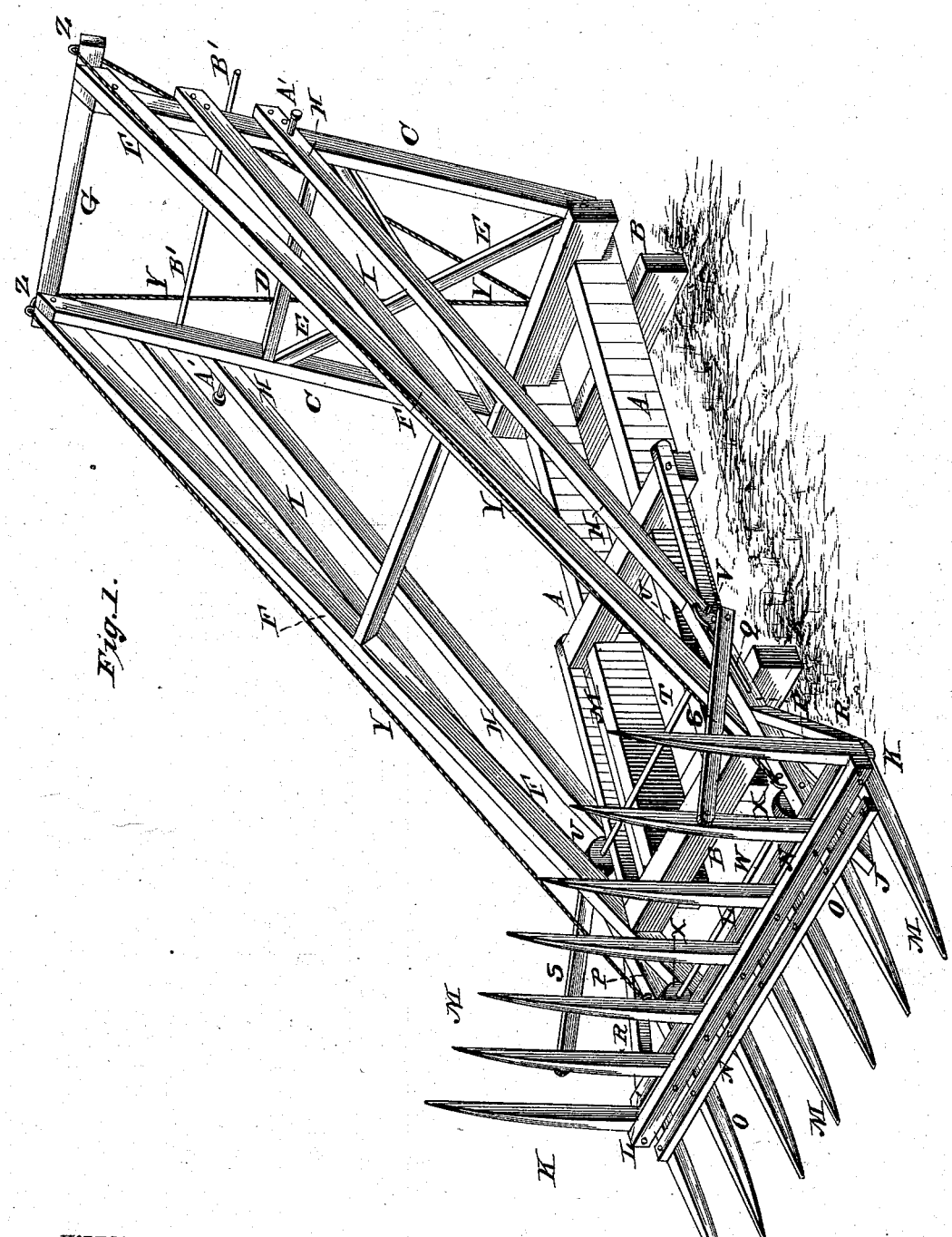
WITNESSES
Fred. G. Dieterich
P. C. Dieterich
INVENTOR
Joseph Dain Jr.
by C. A. Snow and Co.
Attorneys

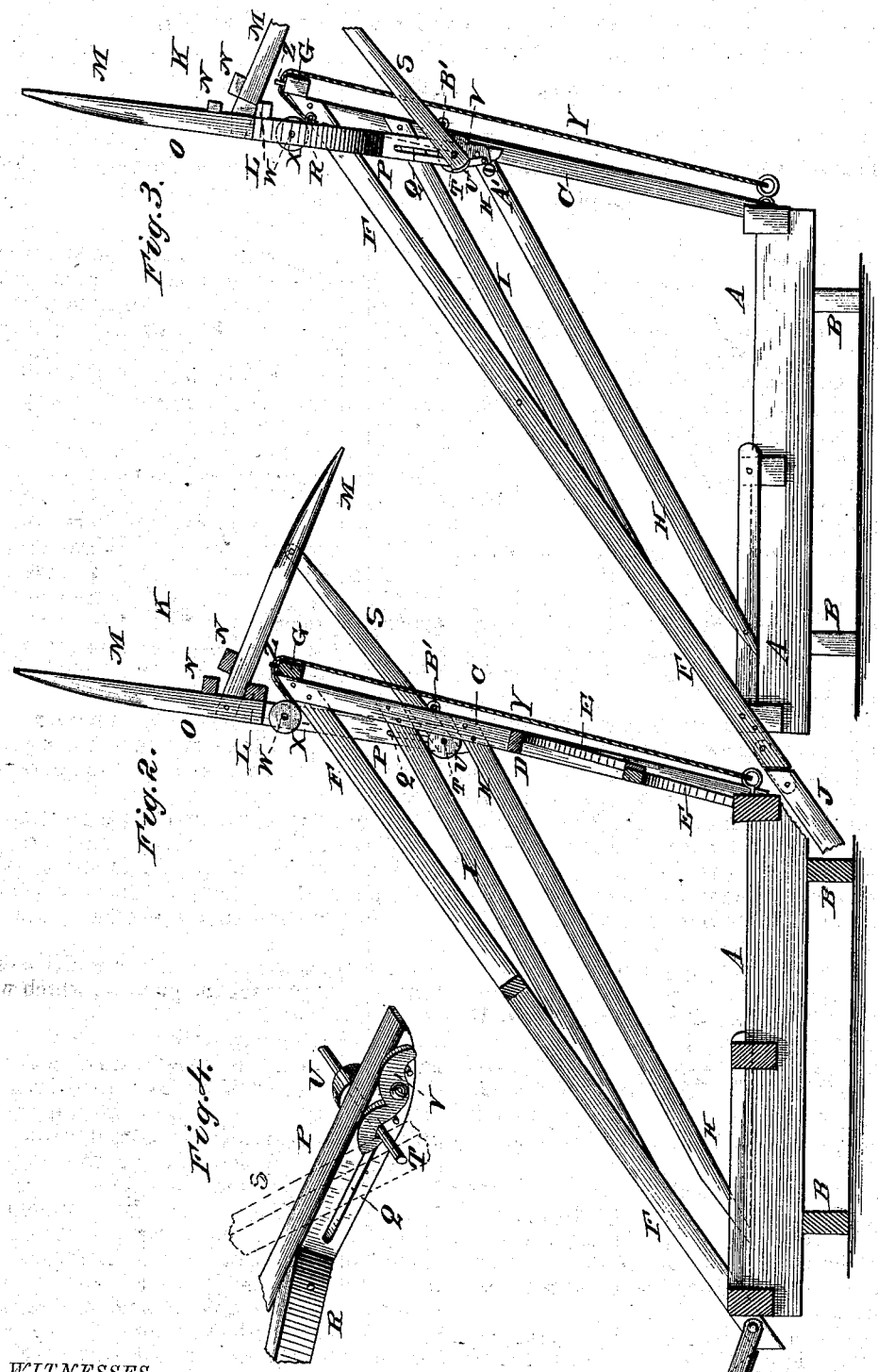

UNITED STATES PATENT OFFICE.

JOSEPH DAIN, JR., OF MEADVILLE, MISSOURI.

HAY ELEVATOR AND STACKER.

SPECIFICATION forming part of Letters Patent No. 252,303, dated January 17, 1882.

Application filed October 27, 1881. (No model.)

*To all whom it may concern:*

Be it known that I, JOSEPH DAIN, Jr., of Meadville, in the county of Linn and State of Missouri, have invented certain new and useful Improvements in Hay Elevators and Stackers; and I do hereby declare that the following is a full, clear, and exact description of the invention, which will enable others skilled in the art to which it appertains to make and use the same, reference being had to the accompanying drawings, which form a part of this specification.

Figure 1 is a perspective view of my improved hay elevating and stacking device. Fig. 2 is a longitudinal sectional view of the same, showing the elevator raised and tilted over the top of the carrier. Fig. 3 is a side view, and Fig. 4 is a detail view of the part of the carrier having the catch.

Corresponding parts in the several figures are denoted by like letters of reference.

This invention relates to hay elevators and stackers; and it consists in certain improvements in the construction of the same, which will be hereinafter fully described, and particularly pointed out in the claims.

In the drawings hereto annexed, A represents the main horizontal frame of my machine, which is supported upon the bolsters B of an ordinary wagon running-gear. The said frame is provided at its rear end with rearward-slanting braces C C, connected by cross-piece D and by the crossed braces E E.

F F are the upper track-beams, which extend diagonally upward from the front cross-beam of the frame to the braces C C, at the tops of which they are connected by a cross-piece, G.

H H are the lower track-beams, which are secured to the sides of the frame and of the braces C C, divergent from the upper track-beams, as shown; and I I are guide-beams arranged above and parallel to the lower track-beams, as shown.

The main or upper track-beams F are provided at their lower ends with hinged extensions J J, which, when the machine is being transported from place to place, may be folded up upon the main track-rails.

The carrier, which is denoted by letter K, consists of a transverse or cross beam, L, to which the teeth M are secured in two rows at an angle to each other of about one hundred and ten degrees, more or less. Suitable strengthening-braces N are or may be employed. Two of the lower teeth, which are distinguished by the letters O O, have rearward projections P P, provided with slots Q Q. R R are diagonal braces, connecting the said arms or projections P with one of the braces N.

S S are pivoted arms, projecting rearward from the upward-projecting teeth M, adjoining the teeth O, and having bearings for a transverse shaft, T, carrying wheels or rollers U, working upon the lower track-beams H between the latter and the parallel guide-beams I. The shaft T moves in the slots Q of the rearward projections of teeth O, and the latter are provided with pivoted lever-catches V, which engage the shaft T and hold it in position, as shown.

W is a shaft journaled between the rearward projections P of the teeth O, and having wheels or rollers X, traveling upon the upper track-beams.

Y Y are ropes attached to the projections P, and passed over pulleys or through staples or dead-eyes Z at the upper transverse beam or cross-piece, G. A single rope may be substituted for the double one shown in the drawings.

A' B' are studs projecting laterally from the braces C, as and for the purpose which will be presently described.

In operation my improved machine is secured by stakes, or in any suitable manner, at the place in the field or barn-yard where it is desired to make the stack. The hay is then gathered by a suitably-constructed horse-rake and deposited upon the carrier, the lower teeth of which meanwhile rest upon the ground. When a sufficient load has been accumulated or deposited upon the carrier, draft is applied to the rope or ropes Y at right angles to the frame until the load is elevated to near the top of the track. The projections P then strike the studs A', which release the catches and tilt the carrier, which drops down between the studs A' and B', being, however, instantaneously again raised to the extent of the length of slots Q, so as to discharge the load upon the stack. When the pull upon ropes Y is released the carrier slides down automatically, and is ready for a repetition of the operation.

While the machine is being transported from place to place the lower end of the main track may be folded up and the carrier partly elevated, as shown and described.

This invention is simple, durable, convenient, and easily operated. It has no complicated levers, ropes, pulleys, springs, or other parts which are liable to get out of repair, and it will do the work for which it is designed efficiently and well.

Having thus described my invention, I claim and desire to secure by Letters Patent of the United States—

1. The combination, in a hay-stacking device, of the diagonal upper track-beams, F F, the lower track-beams, H H, diverging from beams F, and the guide-beams I I, parallel to the lower track-beams, with the carrier having two sets of rollers traveling the one upon the upper and the other upon the lower track-beams, as described, for the purpose set forth.

2. In a hay-stacker, the combination of the tracks, as described, with the herein-described carrier, having teeth O, provided with rearward-projecting arms P, having slots Q, forming bearings for the ends of a shaft mounted in pivoted arms and having rollers or casters, as described, for the purpose shown and specified.

3. The combination of the track having studs A' B' with the herein-described carrier having pivoted latches V and suitable operating mechanism, as described, for the purpose set forth.

In testimony that I claim the foregoing as my own I have hereto affixed my signature in presence of two witnesses.

JOSEPH DAIN, Jr.

Witnesses:
 JOSEPH DAIN,
 W. W. STURGES.